United States Patent [19]
Sokaski

[11] Patent Number: 5,601,325
[45] Date of Patent: Feb. 11, 1997

[54] MATERIAL MOVING SHOVEL AND THE LIKE

[75] Inventor: Thomas J. Sokaski, Andover, Ohio

[73] Assignee: Toolite Incorporated, Ashtabula, Ohio

[21] Appl. No.: 510,036

[22] Filed: Aug. 1, 1995

Related U.S. Application Data

[63] Continuation-in-part of Ser. No. 278,967, Jul. 22, 1994, abandoned.

[51] Int. Cl.$^6$ ...................................................... A01B 1/04
[52] U.S. Cl. ............................................. 294/49; 209/419
[58] Field of Search ................................ 294/49, 51, 55; 172/371; 209/417–419

[56] References Cited

U.S. PATENT DOCUMENTS

| | | | |
|---|---|---|---|
| 93,336 | 8/1869 | Palmer | 209/419 |
| 127,405 | 6/1872 | Butler | 294/49 X |
| 433,546 | 8/1890 | Smith | 294/49 X |
| 787,660 | 4/1905 | Cahill | 294/49 |
| 915,233 | 3/1909 | Smith | 294/55 X |
| 1,083,952 | 1/1914 | Surbaugh | 294/49 |
| 1,146,609 | 7/1915 | Anderson | 294/49 |
| 2,960,230 | 11/1960 | Fracker | 294/49 X |
| 3,638,986 | 2/1972 | Palagonia . | |
| 3,851,763 | 12/1974 | Ball et al. . | |
| 3,976,564 | 8/1976 | Holder | 294/55 X |
| 4,247,141 | 1/1981 | Grint . | |
| 4,305,376 | 12/1981 | Neugent . | |
| 5,383,696 | 1/1995 | Speier | 209/419 X |

OTHER PUBLICATIONS

Structron Tool Survey; Feb. 1995, p. 2: Sketch Disclosing a Shrake (Sifting Shovel).

True Temper Catalog, 1995, pp. 65 & 67: Photographs disclosing rice shovels with perforated blade having one hole in each half of the blade.

*Primary Examiner*—Johnny D. Cherry
*Attorney, Agent, or Firm*—Robert R. Hussey Co. LPA

[57] ABSTRACT

A material moving tool is provided and includes a blade and a handle for manipulating the blade. The blade has an outside perimeter defining the area of the blade. The blade has a plurality of ring shaped apertures therethrough. The blade has a material supporting surface defined by the outside perimeter and the apertures, and is from between 80% to 50% of the area of the blade. When the blade of the material moving tool is inserted in material, it has an effective area described by the perimeter of the blade immersed in the material, and a plurality of ring shaped apertures through the effective area of the blade. The blade has an effective material supporting surface defined by the perimeter of the blade immersed in the material and the effective apertures, and is from between 80% to 50% of the effective area of the blade.

18 Claims, 4 Drawing Sheets

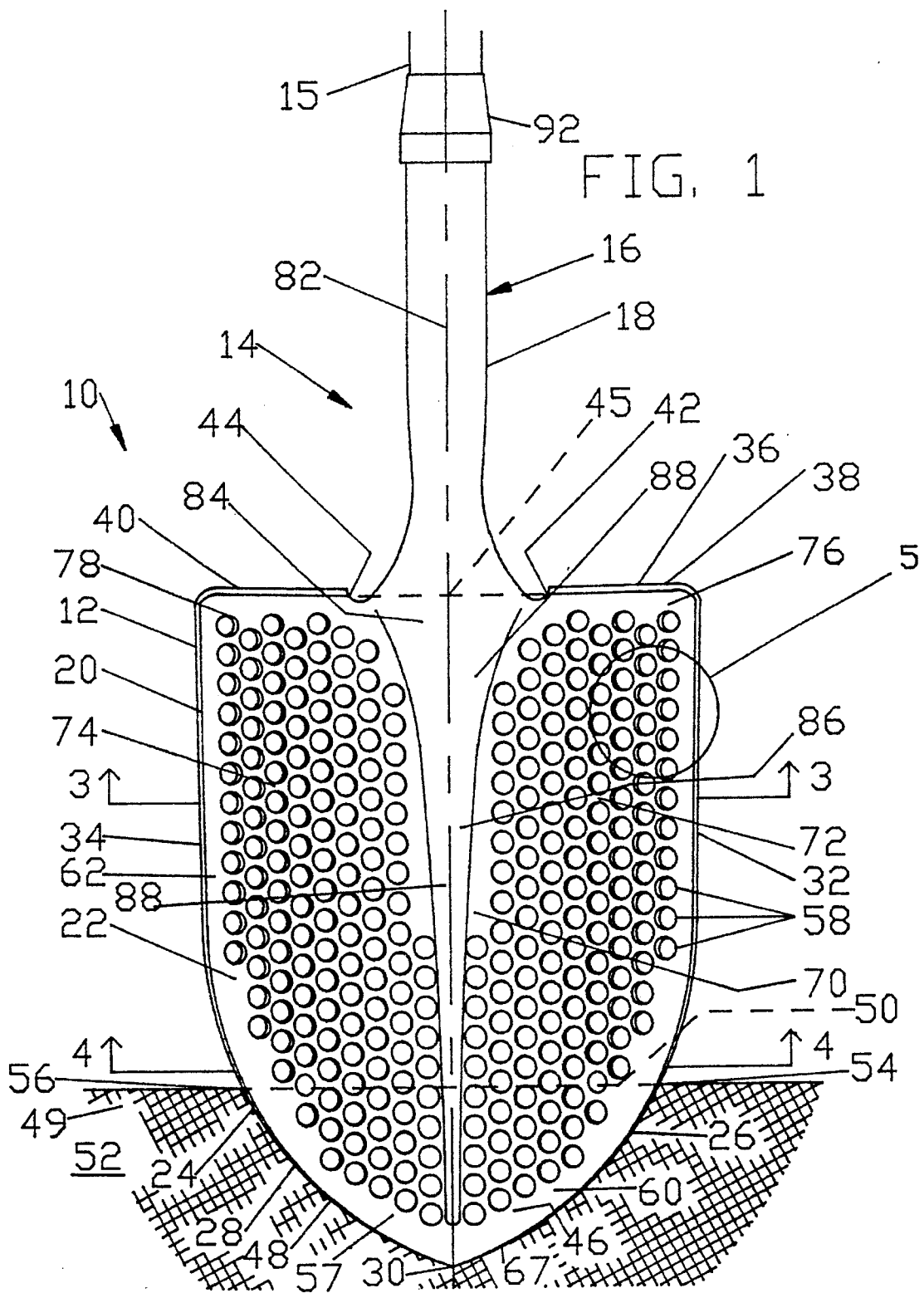

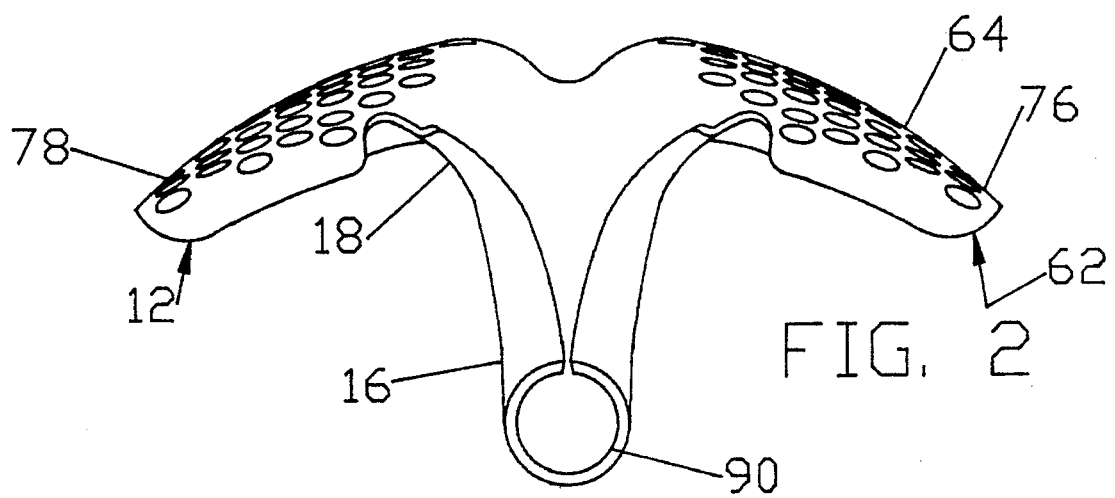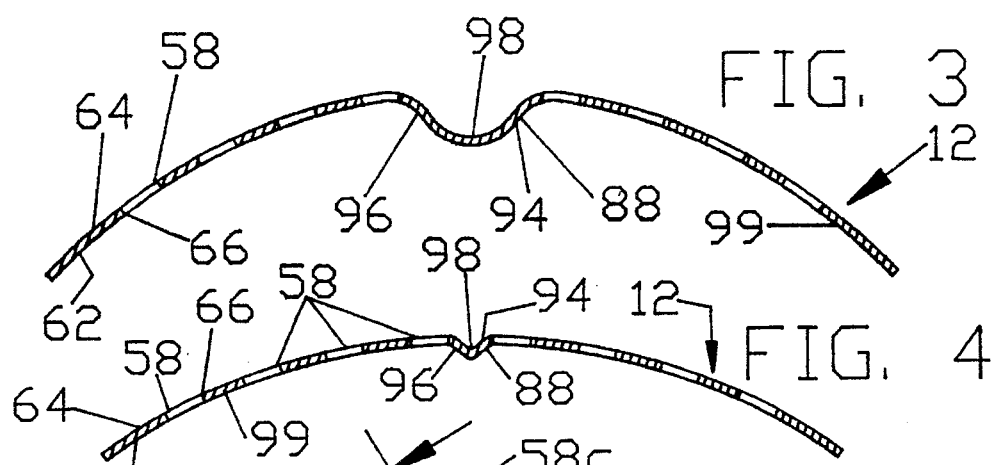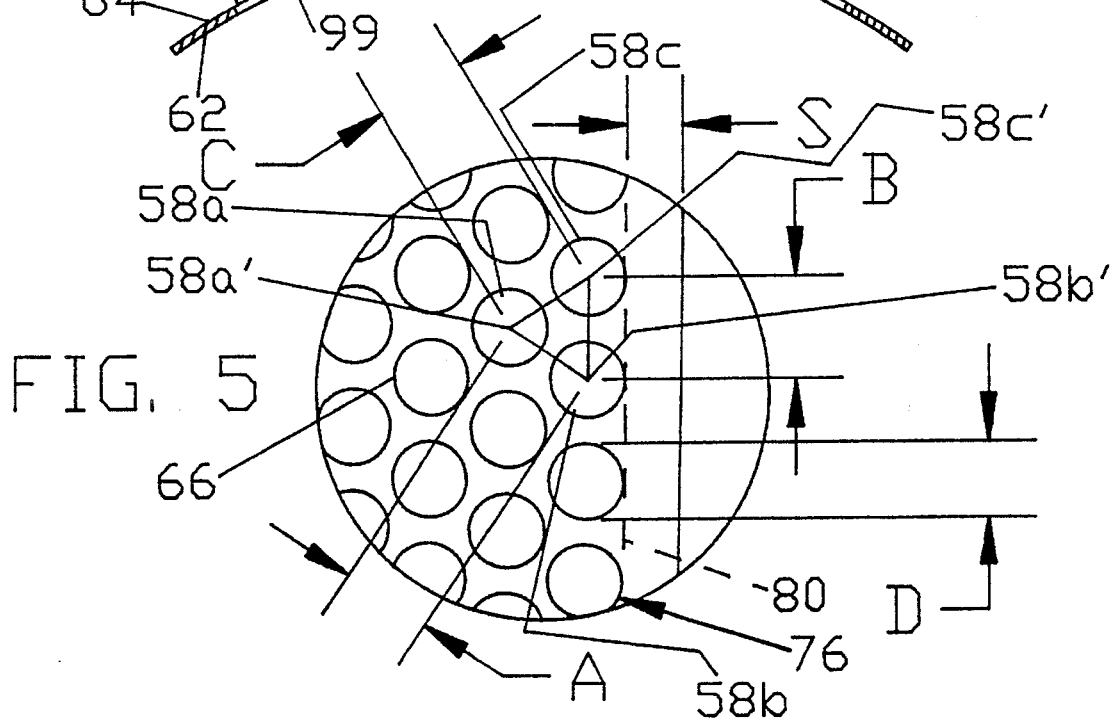

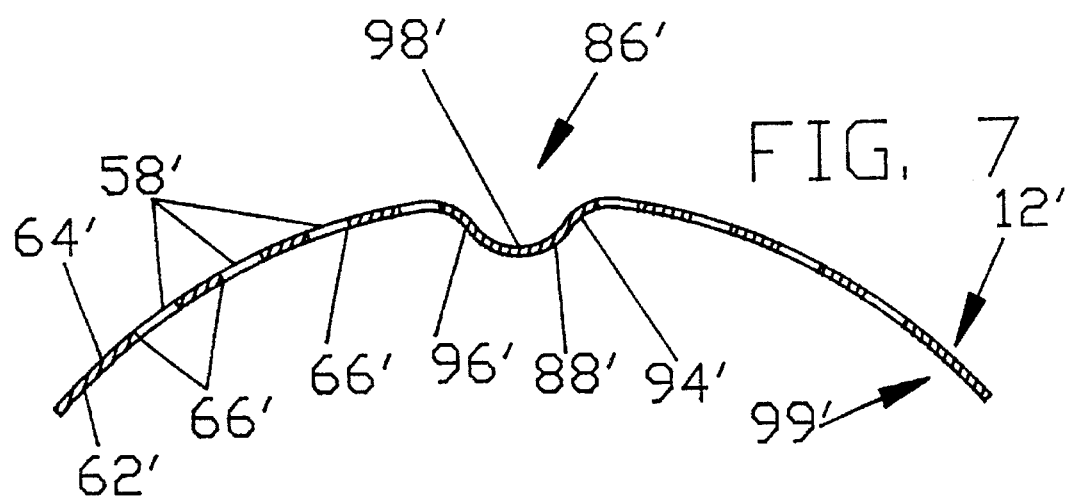
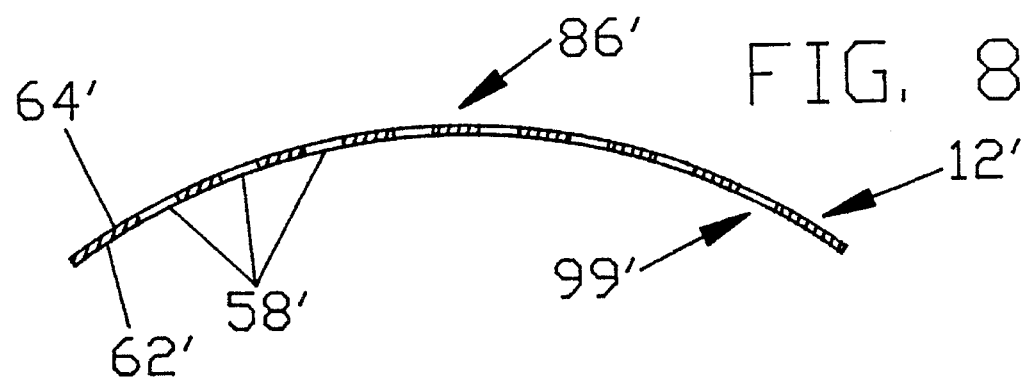

MATERIAL MOVING SHOVEL AND THE LIKE

This is a continuation-in-part of application Ser. No. 08/278,967 filed Jul. 22, 1994, now abandoned.

BACKGROUND OF THE INVENTION

This invention relates in general to material moving tools and more particularly to material moving tools designed to decrease the sticking of material to the tool.

It is well recognized in the field of material moving tools, that tools such as shovels, post hole diggers, hoes, garden trowels, and front end loader and backhoe buckets, are used to move various materials such as soil. When the soil is wet, it becomes sticky and adheres to the material moving tool, such as a shovel.

This problem is particularly apparent, for example, when manually shovelling wet sticky soil out of and from around footings of foundations, sewer systems and lines, water lines, and buried cables. The fact that this is hard work is not as much of a detriment as the fact that the mud frequently sticks to the shovel and makes it virtually impossible to work efficiently. The worker cannot remove the mud from the shovel without some degree of difficulty.

When for example excavating a hole, the shovel is driven into the wet soil (material receiving position), and the worker lifts the shovel and consequently the soil and moves it to another location (material release position). At this location (material releasing position), the soil must be removed from the shovel blade. If the soil sticks to the shovel, extra effort must be made to remove it from the surface of the shovel blade so that the worker can continue digging the hole. In the past, workers have had to scrape the mud off of each shovel or beat the shovel on a rock or a board to get most of the wet soil off of the shovel. This involves substantial additional work. The worker may then continue to dig the hole. This process decreases the worker's efficiency by as much as 50% or more.

The same situation is also true, for example, when digging a hole with a post hole digger, moving wet snow with a snow shovel, or moving wet earth with hoes or garden trowels. This same situation also exists when front end loader or backhoe buckets are used to move wet earth.

It also well recognized that the weight of the material moving tool is an important factor in the efficiency of the worker. When a lighter tool is used, the worker can move more material with the same efficiency as moving less material with a heavier tool, since the weight of the tool and material is the same. When wet soil sticks to and is not removed from the tool, added weight is moved back and forth decreasing the amount of material moved and consequently the efficiency of the worker. The importance of this factor is readily recognized when considering the numerous times this repetitive action must be taken.

The weight of the material moving tool is also an important factor when a machine is used to manipulate the material moving tool such as a front end loader or backhoe bucket. When the tool is lighter, less effort is required of the machine, decreasing the wear and tear on the parts of the machine and the energy required to move the bucket from the material receiving position to the material releasing position.

It is also desirable to strengthen and reinforce the material moving tool to resist deformation when in use. When the worker inserts the tool, such as a shovel, into the wet soil and hits resistance, such as a rock, occasionally he will exert additional pressure tending to deform the shovel at its tip. This situation will be herein referred to as "tipping" where the tip of the shovel is deformed.

Accordingly, it is desirable to provide a material moving tool that minimizes the sticking of wet soil to the tool and accordingly increase the efficiency of the worker.

It is also desirable to provide a material moving tool that is light in weight and that allows the worker to easily move the tool between a material receiving position and a material releasing position.

It is desirable to provide a material moving tool with reinforcing means to resist deformation of the tool when forces are exerted on the tool.

Anderson, U.S. Pat. No. 1,146,609, discloses a shovel having a relatively few large elongated openings. These elongated openings are elongated in a longitudinal direction along the shovel blade in the direction of movement of the shovel into and out of the ground. A number of such openings are located about the blade including the central portion of the shovel. The elongated openings located in the central portion of the shovel taught by Anderson weaken the shovel blade in exactly the location and direction in which strength is required. Such elongated openings do not allow for maximizing the area of the openings in the shovel blade, while optimizing the strength of the shovel when such material is removed.

Other tools are disclosed in Palagonia, U.S. Pat. No. 3,638,986, Ball et al., U.S. Pat. No. 3,851,763 and Grint, U.S. Pat. No. 4,247,141.

A need has long been recognized for a material moving tool which minimizes the sticking of the material to the tool and a tool that is light in weight while having enhanced strength.

SUMMARY OF THE PRESENT INVENTION

The present invention provides a material moving tool with the above described desirable features that may be implemented in a variety of material moving tools, such as shovels, post hole diggers, hoes, garden trowels and backhoe buckets.

The present invention provides a material moving tool including a blade and means for manipulating the blade. When the material moving tool is a shovel, post hole digger, snow shovel, hoe, or garden trowel, the material moving tool has a blade with a handle attached thereto.

When the material moving tool is a front end loader or backhoe bucket, the tool includes a blade and means for manipulating the blade, such as bucket sides and top connectors secured to the blade for securement to a mechanism such as a tractor with a hydraulic mechanism for manipulating the blade.

The present invention provides a novel blade for moving material which provides the advantageous features of the present invention. The blade has an outside perimeter defining the area of the blade. The blade has a plurality of ring shaped apertures there through. The blade has a material supporting surface defined by its outside perimeter and the ring shaped apertures therethrough. The material supporting surface of the blade is from between 80% to 50% of the area of the blade. By removing this amount of material from the blade, it is substantially lighter.

It is believed that the adhesion of the wet soil to the blade is decreased because the adhesive strength of the wet soil is directly proportional to the surface area of the shovel blade. By decreasing the area of the shovel blade without substantially diminishing support and containment of the wet soil, the adhesion of the wet soil to the blade is decreased as a result of the apertures. When the adhesive strength is decreased enough, the weight of the wet soil overcomes its adhesion to the material supporting surface of the shovel and falls off the shovel blade. In addition, it is also believed that the apertures allow air to pass through thus breaking a suction that the wet soil creates. The apertures decrease adhesion to the shovel by allowing more water to pass through the apertures, thus providing better lubrication of the shovel blade.

Each of the apertures are ring shaped as, for example, a circle or polygon having substantially equal sides. This geometric configuration of the apertures allows a substantial amount of material to be removed from the blade while maintaining the structural integrity of the blade.

The ring shaped geometric configuration of the apertures also provides for a blade material supporting surface which allows wet material, such as mud, to be readily removed when desired. The rims defining the apertures support the material to resist the flow of material into the aperture and operate as a resistance to removal of the wet material from the blade.

It is desirable to minimize the material supporting surface of the blade and accordingly decrease the tendency of the wet soil to adhere to the blade. This allows the wet soil to be more readily released from the blade when desired. To so minimize the material supporting surface, the adjacent apertures are located substantially equal distance from each other. This allows for maximizing the area of the apertures and consequently minimizing the area of the material supporting surface while maintaining the structural integrity of the blade.

Important features of the invention are achieved by providing ring shaped apertures and their cross sectional area, and the substantially equidistant spacing of those apertures. If on the one hand the apertures are too small, they are ineffectual in achieving the features of the present invention. On the other hand, if they are too large, too much material is removed in one place, thus weakening the structural integrity of the blade. It has been found that ring shaped apertures having a cross sectional area of from between about 0.012 square inches to about 0.2 square inches provide a shovel that achieves the desirable results of the present invention. One type of ring shaped aperture that achieves these results is a circular aperture from between about 0.125 inches to about 0.5 inches in diameter. The ring shaped geometric configuration of the aperture also provides important features of the present invention. It should be understood that the ring shaped aperture is in the configuration of a circle or a polygon having substantially equal sides or even an irregular shape in the general configuration of a circle or a polygon having substantially equal sides. This configuration of the aperture provides for removal of material of the blade while maintaining the structural integrity of the blade.

The substantially equidistant spacing likewise provides important features of the blade of the present invention. It has been found that spacing the adjacent ring shaped apertures described by the present invention from each other a distance of from about 0.1875 inches to about 0.625 inches provides a shovel that achieves the desirable results of the present invention. Equidistant spacing of adjacent apertures maintains the structural integrity of the blade since there are no continuous substantial spaces in the blade which tend to weaken the blade.

The combination of the ring shaped configuration of the apertures, their size, and substantially equidistant spacing of the apertures provides for an interconnecting web of blade material defining the material supporting surface and provides for structural integrity of the blade. In addition, by so configuring the material supporting surface, a more continuous material supporting surface is provided.

The blade of the present invention has a material engaging edge for insertion into the soil. The apertures are located at least a predetermined distance away from the bottom edge and the rest of the periphery of the blade so as to provide strength in the peripheral area of the blade when forces are exerted on the blade to drive it into the ground.

The material moving tool of the present invention has reinforcing means for resisting deformation of the blade. Such reinforcing means minimizes the "tipping" of the shovel and resists deformation of the blade when forces are exerted thereon to drive the blade into the ground.

The reinforcing means of the present invention includes a rib formed in the blade along the axis along which deformation is to be resisted. For example, in a shovel blade, the top of the blade is formed to receive the handle therein and secure the handle thereto. The present invention provides forming a rib continuing down the center of the blade to a position adjacent its bottom edge. This central rib enhances the strength of the blade. The reinforcing means of the present invention also may include the central portion of the shovel without apertures therethrough to enhance the strength of the blade.

The geometric configuration of the apertures provides for forming the apertures at substantially equal distances from their adjacent apertures. Generally, the shovel blade is divided into a central portion and a right side portion and a left side portion. Each of the side portions have an outer edge with a row of apertures adjacent the outer edge and along a line parallel to the outer edge. The line along which the outer row of apertures is positioned is spaced a sufficient distance from the edge so as to provide solid outside edges. Each of the outer edge row of apertures of each side and each successive row is spaced so that the apertures are formed substantially equal distance from each other to thereby maximize the strength and minimize the weight of the shovel. Preferably, the central portion of the shovel blade does not have apertures therein so as to reinforce the blade as described above.

Other desirable features and advantages of the present invention will become apparent from a study of the following description and the accompanying drawings which are illustrative of the invention.

BRIEF DESCRIPTION OF THE DRAWINGS

FIG. 1 is a front view of a shovel embodying the features of the material moving tool of the present invention.

FIG. 2 is a top view of the shovel shown in FIG. 1.

FIG. 3 is a sectional view of the shovel shown in FIG. 1 and taken along lines 3—3 thereof.

FIG. 4 is a sectional top view of the shovel shown in FIG. 1 and taken along lines 4—4 thereof.

FIG. 5 is a exploded view of a portion of the shovel shown in FIG. 1 indicated at 5 in FIG. 1.

FIG. 7 is a sectional view of the shovel shown in FIG. 6 and taken along lines 7—7 thereof.

FIG. 8 is a sectional top view of the shovel shown in FIG. 6 and taken along lines 8—8 thereof.

DETAILED DESCRIPTION OF THE INVENTION

Figure 6:
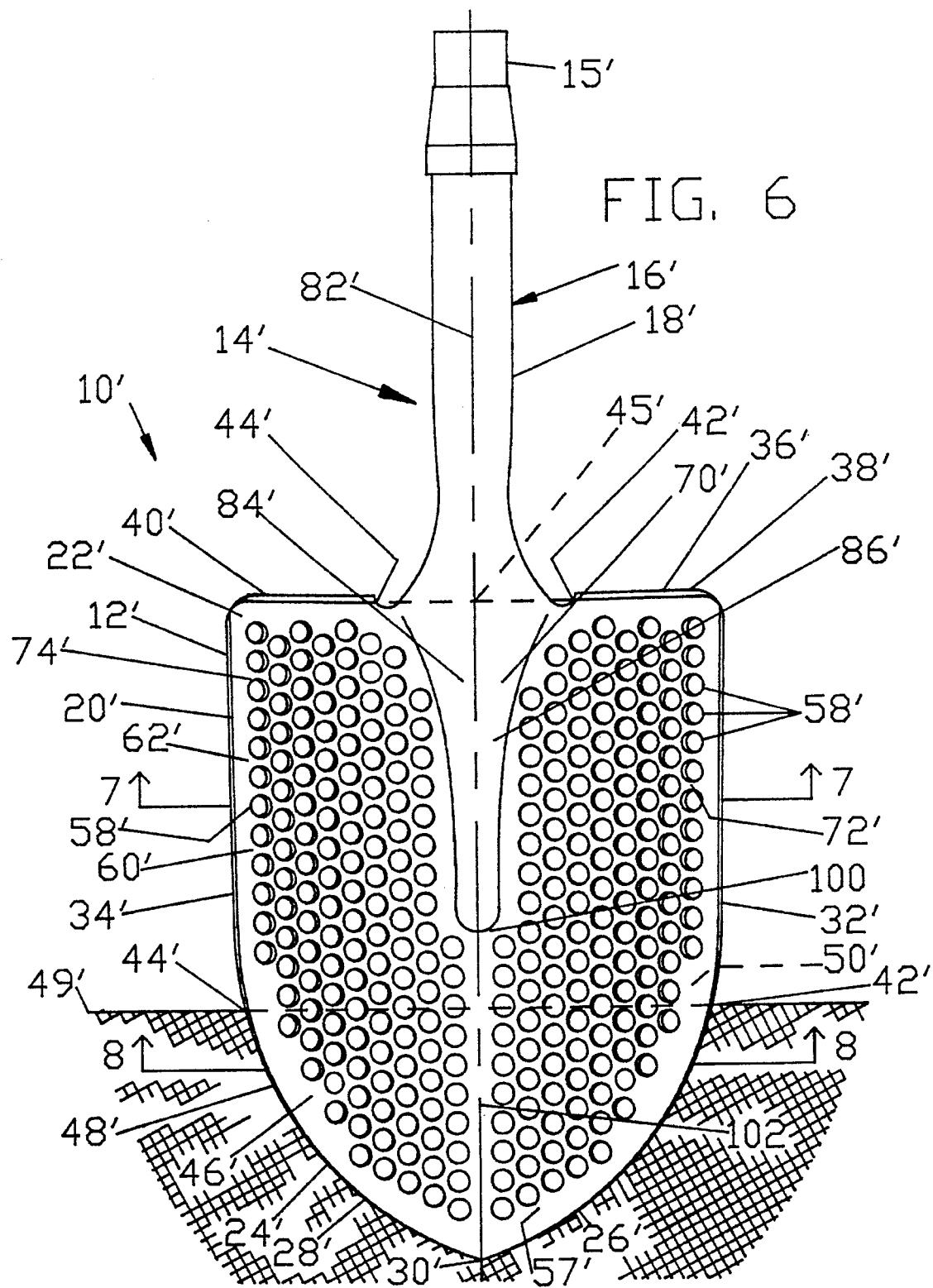
FIG. 6 is a front view of another embodiment of the present invention.

The present invention provides a material moving tool with desirable features that may be implemented in a variety of such tools, such as shovels, post hole diggers, hoes, garden trowels and front end loaders and backhoe buckets. For ease of description, the present invention will be described in connection with a shovel 10 shown in FIG. 1 and it should be understood that the advantageous features of the present inventions may be used in connection with a variety of material moving tools.

The shovel 10, shown in FIG. 1, includes a blade 12 and means 14 for manipulating the blade, such as the handle 15, and the connecting means 16. The blade 12 is connected to the handle 15 by the connecting means 16 described below. The connecting means 16 has a blade connector portion 18 formed integrally with the blade 12 for attachment of the handle 15 to the blade 12.

The blade 12 has an outside perimeter 20 defining the area 22 of the blade. The outside perimeter 20 is defined in part by the bottom edge 24 having right and left portions 26, 28 respectively. The right and left portions 26, 28 of the bottom edge 24 converge in a point 30 which is used to begin entry of the shovel blade 12 into the ground as will hereinafter be more fully described.

The outside perimeter 20 of the blade 12 is also defined by right and left side edges 32, 34 and the top edge, indicated at 36. The side edges 32, 34 extend upwardly from their respective bottom edge portions 26, 28 and terminate at the right and left top edge portions 38, 40 respectively of the top edge 36. The top edge portions 38, 40 extend inwardly toward the center of the blade 12 and terminate with the blade connector portion 18 at points 42, 44 respectively.

It should be understood that for purposes of defining the present invention, the top edge 36 includes the top edge portions 38, 40 and a line indicated by the dashed line at 45 which interconnects the points 42, 44. It is within the contemplation of this invention to utilize the invention in a wide variety of blades having different geometric configurations.

In use, the point 30 of the shovel 12 is placed on the ground where soil is to be removed. The worker places their foot on one of the top edge portions 38, 40 and exerts a downward force on the blade 12, driving the point 30 and subsequently the bottom edge 24 and bottom edge portions 26, 28 into the ground. If additional force is exerted on the blade, the left and right side edges 32, 34 are driven into the ground. If desired, the shovel may even be driven into the ground until the top edge portions 38, 40 are in contact with the ground. This position is the material receiving position of the shovel 10. The worker then lifts the blade 12 with soil thereon to a material release position where the soil is removed from the blade.

The effective area 46 of the shovel blade 12 is defined by the effective perimeter 48 of the blade 12 in the ground 49. This effective perimeter 48 is defined by the perimeter of the blade 12 in the ground and a line 50 connecting the perimeter of the blade where it emerges from the ground 49.

For example, FIG. 1 shows the blade 12 inserted in the ground 52. In this example, the effective area 46 of the shovel blade 12 is defined by the effective perimeter 48 of the blade 12 in the ground. This effective perimeter 48 is defined by the bottom edge portions 26, 28 from the point 30 to the points 54, 56 respectively where they emerge from the ground and a line 50 connecting the points 54, 56. The effective area 46 of the blade 12 is the total area of the blade 12 bounded by the effective perimeter 48. The effective material supporting surface 57 is defined by the effective area 46 of the blade 12 and the apertures 58.

The blade 12 has a plurality of ring shaped apertures 58 there-through. The blade 12 has a material supporting surface 60 defined by its outside perimeter 20 and the ring shaped apertures 58 therethrough as will be more fully described. The material supporting surface 60 of the blade.12 is from between 80% to 50% of the area 22 of the blade while the total area of the apertures is from between 20% to 50% of the area 22 of the blade. By removing this amount of material from the blade 12, it is substantially lighter.

It is desirable to minimize the area of the material supporting surface 60 of the blade 12 and accordingly decrease the tendency of the wet soil to adhere to the blade. This allows the wet soil to be more readily released from the blade 12 when desired.

The present invention provides for the design and spacing of the apertures so as to effective lighten the shovel blade 12 while optimizing its strength. Each of the apertures 58 is ring shaped as for example, a circle or polygon having substantially equal sides. This geometric configuration of the apertures 58 allows a substantial amount of material to be removed from the blade 12 while maintaining the structural integrity of the blade.

The apertures 58, seen in FIGS. 2, 3, and 4, extend through the front 62 of the shovel blade 12 and through the back 64 of the shovel blade. Preferably, the apertures 58 are circular as seen in the exploded view of a portion of the shovel blade 12 in FIG. 5. Each of the apertures 58 has a rim 66 defining the aperture.

The ring shaped geometric configuration of the apertures 58 provides a blade 12 with a material supporting surface 60 which allows wet material, such as mud to be readily removed when desired. The rims 66 defining the apertures 58 support the wet material over a substantial cumulative open area to allow the wet soil to be more readily released from the blade 12 when desired.

To minimize the material supporting surface 60 in accordance with the present invention, the adjacent apertures 58 are located substantially equal distances from each other. This allows for maximizing the area of the apertures 58 and consequently minimizing the area of the material supporting surface 60 while maintaining the structural integrity of the blade 12.

For purposes of illustration, three apertures 58a, 58b, and 58c are shown in FIG. 5. The centers 58a', 58b' and 58c' of the apertures 58a, 58b, and 58c are substantially equidistant from each other. The center 58a' of the aperture 58a is a distance A from the center 58b' of the aperture 58b. Likewise, the center 58b' of the aperture 58b is a distance B from the center 58c' of the aperture 58c, and center 58c' of the aperture 58c is a distance C from the center 58a' of the aperture 58a. The distances A, B, and C are substantially equal.

It should be understood that the distances A, B, and C are dependent on and determined by the area of the apertures 58. Preferably, the apertures 58 have a diameter D from between about 0.125 inches to about 0.5 inches. The area of each of the apertures 58 is from between about 0,012 square inches to about 0.2 square inches. The distances A, B, and C are equal and are from between about 0.1875 inches to about 0.625 inches. The material supporting surface 60 is defined by the area 22 of the blade described by the outside perimeter 20 and the rims 66 of the ring shaped apertures 58. Of course, the open area of the apertures 58 is not material supporting surface 60.

By so selecting the area of the apertures 58 and their center distances A, B, and C, the material supporting surface 60 is from between 80% to 50% of the area 22 of the blade while the total area of the apertures is from between 20% to 50% of the area 22 of the blade. Preferably, the material supporting surface 60 is from between 75% to 65% of the area 22 of the blade while the total area of the apertures is from between 25% to 35% of the area 22 of the blade. By so configuring the blade 12, the features of the present invention are realized.

The effective material supporting surface 57 is from between 80% to 50% of the effective area 46 of the blade while the total area of the apertures 58 in the effective area 46 is from between 20% to 50% of the effective area 46 of the blade. Preferably, the effective material supporting surface 57 is from between 75% to 65% of the effective area 46 of the blade while the total area of the apertures 58 in the effective area 46 is from between 25% to 35% of the effective area 46 of the blade.

Important features of the invention are achieved by providing ring shaped apertures 58 and their cross sectional area, and the substantially equidistant spacing of those apertures. If on the one hand the apertures 58 are too small, they are ineffectual in achieving the features of the present invention. On the other hand, if they are too large, too much material is removed in one place, thus weakening the structural integrity of the blade 12. It has been found that ring shaped apertures 58 having a cross sectional area of from between about 0.012 square inches to about 0.2 square inches provide a shovel 10 that achieves the desirable results of the present invention. One type of ring shaped aperture 58 that achieves these results is a circular aperture from between about 0.125 inches to about 0.5 inches in diameter. The ring shaped geometric configuration of the aperture also provides important features of the present invention. It should be understood that the ring shaped aperture 58 is in the configuration of a circle or a polygon having substantially equal sides or even an irregular shape in the general configuration of a circle or a polygon having substantially equal sides. This configuration of the aperture 58 provides for removal of material of the blade while maintaining the structural integrity of the blade 12.

The substantially equidistant spacing likewise provides important features of the blade of the present invention. It has been found that spacing the adjacent ring shaped apertures 58 described by the present invention from each other a distance of from about 0.1875 inches to about 0.625 inches provides a shovel that achieves the desirable results of the present invention. Equidistant spacing of adjacent apertures maintains the structural integrity of the blade 12 since there are no continuous substantial spaces in the blade which tend to weaken the blade.

The combination of the ring shaped configuration of the apertures 58, their size, and substantially equidistant spacing of the apertures provides for an interconnecting web of blade material defining the material supporting surface, 60 or 57 as the case may be, and provides for structural integrity of the blade. In addition, by so configuring the material supporting surface, 60 or 57 as the case may be, a more continuous material supporting surface is provided.

The blade 12 of the present invention has a material engaging edge 67 including the bottom edge 24 and the side edges 32, 34 for insertion into the soil. As shown in FIGS. 1 and 5, the apertures 58 are located at least a predetermined distance S away from the bottom edge and the side edges 32, 34 and the rest of the periphery of the blade 12 so as to provide strength in the peripheral area 68 of the blade 12 when forces are exerted on the blade to drive it into the ground.

Generally, the shovel blade 12 is divided into a central portion 70 and a right side portion 72 and a left side portion 74 as seen in FIG. 1. Each of the side portions 72, 74 has an outer edge 32, 34 respectively with a row of apertures 76, 78 adjacent their respective outer edges and along a line 80 substantially parallel to the outer edges 32, 34. The line 80 along which the outer row of apertures 76, 78 is positioned is spaced a sufficient distance S from the outer edges 32, 34 so as to provide solid outside edges. Preferably, the distance S is from between about 0.125 inches to about 0.5 inches.

Each of the outer edge rows 76, 78 of apertures 58 of each side and each successive row is spaced so that the apertures are formed substantially equal distance from each other to thereby maximize the strength and minimize the weight of the shovel. Preferably, the central portion of the shovel blade does not have apertures therein so as to reinforce the blade as described herein.

Preferably, the outer edges 32, 34 of the shovel are generally at a slight angle to the center line 82 of the shovel and converging towards the bottom center of the shovel indicated by the point 30. By so positioning the apertures 58 on each side of the shovel, substantially parallel to the outside edges 32, 34, more material is left in the top central portion 84 of the shovel blade 12 gradually decreasing to the bottom edge 24 of the shovel. If apertures are not formed in the central portion 70 of the blade, the shovel blade is strengthened in its central portion particularly in the top 84 of the shovel 10.

The material moving tool 10 of the present invention has reinforcing means 86 for resisting deformation of the blade 12 as seen in FIG. 1. Such reinforcing means 86 minimizes "tipping" of the shovel 10 and resists deformation of the blade 12 when forces are exerted thereon to drive the blade into the ground.

The reinforcing means 86 of the present invention includes a rib 88 formed in the blade 12 in its central portion 70 along the center line axis 82 along which deformation is to be resisted. The top 84 of the blade 12 is formed to receive the handle 15 therein and secure the handle thereto. As seen in FIGS. 1 and 2, the connecting means 16 includes a blade connector portion 18 formed integrally with the blade 12. The blade connector portion 18 forms an aperture 90 for receiving the handle 15 therein. The connecting means 16 includes a collar 92 for securing the handle to the blade connector portion 18. It should be understood that the use of any known connecting means is within the contemplation of this invention.

The present invention provides forming a rib 88 continuing from the blade connector portion 18 down the center of the blade 70 to a position adjacent its bottom edge 24. As can be seen in FIGS. 3 and 4, the rib 88 has a continually decreasing width and height so that it blends into the bottom of the blade so as not to resist movement of the blade 12 into the ground. At the top of the blade 12, the rib 88 is integral with the connector portion 18. In the intermediate portion indicated by the sectional views of FIGS. 3 and 4, the rib 88 has inwardly protruding portions 94, 96 terminating in a top portion 98 of the rib 88. The rib 88 decreases in width between the protruding portions 94, 96 and also decreases in height of top portion 98 toward the bottom edge 24 of the blade 12. The rib 88 extends substantially the length of the central portion 70 of the blade 12. This central rib 88 enhances the strength of the blade.

The blade 12 is formed with the front 62 of the shovel blade in a concave shape, as indicated at 99. This concave shape 99 enhances the strength of the shovel 10.

Another embodiment of the material moving tool 10' of the present invention is shown in FIGS. 6, 7, and 8 and is similar in construction with the material moving tool 10 described above. For ease of description, the material moving tool 10' is numbered with numerals the same as used in connection with the shovel 10 to denote common parts where appropriate and followed by a prime (') mark to denote the shovel 10'.

The shovel 10', shown in FIG. 6, includes a blade 12' and means 14' for manipulating the blade, such as the handle 15', and the connecting means 16'.

The blade 12' has an outside perimeter 20' defining the area 22' of the blade. The outside perimeter 20' is defined in part by the bottom edge 24' having right and left portions 26', 28' respectively. The outside perimeter 20' of the blade 12' is also defined by right and left side edges 32', 34' and the top edge, indicated at 36'. The side edges 32', 34' extend upwardly from their respective bottom edge portions 26', 28' and terminate at the right and left top edge portions 38', 40' respectively of the top edge 36'. The top edge portions 38', 40' extend inwardly toward the center of the blade 12' and terminate with the blade connector portion 18' at points 42', 44' respectively. It should be understood that for purposes of defining the present invention, the top edge 36' includes the top edge portions 38', 40' and a line indicated by the dashed line at 45' which interconnects the points 42', 44'.

The effective area 46' of the shovel blade 12' is defined by the effective perimeter 48' of the blade 12' in the ground 49'. This effective perimeter 48' is defined by the perimeter of the blade 12' in the ground 49' and a line 50' connecting the perimeter of the blade where it emerges from the ground 49'.

The blade 12' has a plurality of ring shaped apertures 58' therethrough. The blade 12' has a material supporting surface 60' defined by its outside perimeter 20' and the ring shaped apertures 58' therethrough. The material supporting surface 60' of the blade 12' is from between 80% to 50% of the area of the blade while the total area of the apertures 58' is from between 20% to 50% of the area of the blade. By removing this amount of material from the blade 12', it is substantially lighter The effective material supporting surface 57' is from between 80% to 50% of the effective area 46' of the blade while the total area of the apertures 58' in the effective area 46' is from between 20% to 50% of the area of the blade. Preferably, the effective material supporting surface 57' is from between 75% to 65% of the effective area 46' of the blade while the total area of the apertures 58' in the effective area 46' is from between 25% to 35% of the effective area 46' of the blade.

The ring shaped apertures 58' extend through the front 62' of the shovel blade 12' and through the back 64' of the shovel blade. Preferably, the apertures 58' are circular. Each of the apertures 58' has a rim 66' defining the aperture.

To minimize the material supporting surface 60' in accordance with the present invention, the adjacent apertures 58' are located substantially equal distances from each other. The apertures 58' are spaced with respect to each other and the edges and edge portions 24', 26', 28', 32', 34', and 36' as described above in Important features of the invention are achieved by providing ring shaped apertures 58' and their cross sectional area, and the substantially equidistant spacing of those apertures. If on the one hand the apertures 58' are too small, they are ineffectual in achieving the features of the present invention. On the other hand, if they are too large, too much material is removed in one place, thus weakening the structural integrity of the blade 12'. It has been found that ring shaped apertures 58' having a cross sectional area of from between about 0.012 square inches to about 0.2 square inches provide a shovel 10 that achieves the desirable results of the present invention. One type of ring shaped aperture 58' that achieves these results is a circular aperture from between about 0.125 inches to about 0.5 inches in diameter. The ring shaped geometric configuration of the aperture also provides important features of the present invention. It should be understood that the ring shaped aperture 58' is in the configuration of a circle or a polygon having substantially equal sides or even an irregular shape in the general configuration of a circle or a polygon having substantially equal sides. This configuration of the aperture 58' provides for removal of material of the blade while maintaining the structural integrity of the blade 12'.

The substantially equidistant spacing likewise provides important features of the blade of the present invention. It has been found that spacing the adjacent ring shaped apertures 58' described by the present invention from each other a distance of from about 0.1875 inches to about 0.625 inches provides a shovel that achieves the desirable results of the present invention. Equidistant spacing of adjacent apertures maintains the structural integrity of the blade 12' since there are no continuous substantial spaces in the blade which tend to weaken the blade.

Generally, the shovel blade 12' is divided into a central portion 70' and a right side portion 72' and a left side portion 74' as seen in FIG. 6. The central portion 70' of the shovel blade 12' does not have apertures therein so as to reinforce the blade as described herein. Since apertures are not formed in the central portion 70' of the blade, strengthening the shovel blade in its central portion, particularly in the top central portion 84' of the shovel 10 ', is provided.

The material moving tool 10' of the present invention has reinforcing means 86' for resisting deformation of the blade 12' as seen in FIGS. 6, 7, and 8. Such reinforcing means 86' decreases "tipping" of the shovel 10' and resists deformation of the blade 12' when forces are exerted thereon to drive the blade into the ground.

The reinforcing means 86' of the present invention includes a rib 88' formed in the blade 12' in its top central portion 84' along the center line axis 82' along which deformation is to be resisted. The top 84' of the blade 12' is formed to receive the handle 15' therein and secure the handle thereto by the connecting means 16' which includes a blade connector portion 18' formed integrally with the blade 12'. The rib 88' has inwardly protruding portions 94', 96' terminating in a top portion 98' of the rib 88'. The reinforcing rib 88' continues from the blade connector portion 18' down the center of the blade 70' to a position in the middle portion 100 of the blade 12'.

The reinforcing means 86' of the present invention includes a lower central portion 102 without apertures therein. By forming the lower central portion 102 in this manner, the problem of "tipping" is decreased.

The blade 12' is formed with the front 62' of the shovel blade in a concave or curvilinear shape, as indicated at 99'.

This concave shape 99' enhances the strength of the shovel 10'.

It should be understood that it is within the contemplation of this invention to provide a wide variety of constructions and designs in the use of the present invention. For example, a wide variety of material moving blades used in shovels, post hole diggers, hoes, garden trowels and front end loaders and backhoe buckets may utilize the present invention. It is also within the contemplation of this invention to provide apertures 58 or 58' in the lower central portion 102 in certain designs when additional strength is not required.

The invention has been described with reference to the preferred embodiments. Obviously, modifications and alterations will occur to others upon reading and understanding of this specification. It is my intention to include all modifications and alterations insofar as they come within the scope of the appended claims or the equivalents thereof.

Having described my invention, I claim:

1. A material moving tool comprising:

a blade, and means for manipulating said blade, said blade having an outside perimeter defining the area of said blade, said blade having a plurality of apertures therethrough, and a material supporting surface defined by said outside perimeter and said apertures, wherein said material supporting surface is from between 80% to 50% of said area of said blade and wherein each of said apertures has an area from between about 0.012 square inches to about 0.2 square inches.

2. A material moving tool as described in claim 1 wherein said material supporting surface is from between 75% to 65% of said area of said blade.

3. A material moving tool as described in claim 1 wherein said apertures are ring shaped.

4. A material moving tool as described in claim 3 wherein at least one of said apertures is generally circular and has a diameter from between about 0.125 to about 0.5 inches.

5. A material moving tool as described in claim 1 wherein the minimum distance of said apertures from said outside perimeter is from between about 0.125 inches to about 0.5 inches.

6. A material moving tool as described in claim 1 wherein the centers of at least three of said apertures are adjacent each other and substantially equidistant from each other.

7. A material moving tool as described in claim 6 wherein the centers of at least three of said apertures are equidistant from each other a distance of from between about 0.1875 inches to about 0.625 inches.

8. A material moving tool as described in claim 1, said blade having reinforcing means for resisting deformation of said blade.

9. A material moving tool as described in claim 8, wherein said reinforcing means includes a rib formed in said blade along a center line axis along which deformation is to be resisted and extending substantially the length of said blade.

10. A material moving tool as described in claim 8, wherein said reinforcing means includes a central portion of said blade which is formed entirely of said material supporting surface.

11. A material moving tool comprising:

a blade, and means for manipulating said blade, said blade having an outside perimeter defining the area of said blade, said blade having a plurality of apertures therethrough, and a material supporting surface defined by said outside perimeter and said apertures, wherein said material supporting surface is from between 80% to 50% of said area of said blade and wherein the centers of at least three of said apertures are adjacent each other and substantially equidistant from each other a distance of from between about 0.1875 inches to about 0.625 inches.

12. A material moving tool as described in claim 11 wherein said material supporting surface is from between 75% to 65% of said area of said blade.

13. A material moving tool as described in claim 11 wherein the area of each of said apertures is from between about 0.012 square inches to about 0.2 square inches.

14. A material moving tool as described in claim 13 wherein at least one of said apertures is generally circular and has a diameter from between about 0.125 to about 0.5 inches.

15. A material moving tool as described in claim 11 wherein said apertures are ring shaped.

16. A material moving tool as described in claim 11, said blade having reinforcing means for resisting deformation of said blade.

17. A material moving tool as described in claim 16, wherein said reinforcing means includes a rib formed in said blade along a center line axis along which deformation is to be resisted and extending substantially the length of said blade.

18. A material moving tool comprising:

a blade, and means for manipulating said blade, said blade having an outside perimeter defining the area of said blade, said blade having a plurality of apertures therethrough, and a material supporting surface defined by said outside perimeter and said apertures, wherein said material supporting surface is from between 80% to 50% of said area of said blade, each of said apertures have an area from between about 0.012 square inches to about 0.2 square inches, and wherein the centers of at least three of said apertures are adjacent each other and substantially equidistant from each other a distance of from between about 0.1875 inches to about 0.625 inches.

* * * * *